Sept. 24, 1968 R. N. BREED ET AL 3,403,230

EQUIPMENT FOR SERVING DIALING IRREGULARITIES

Filed July 15, 1965 2 Sheets-Sheet 1

INVENTORS R. N. BREED
A. H. BUDLONG
R. C. CASTERLINE
B. J. LEWIS

BY [signature]

ATTORNEY

EQUIPMENT FOR SERVING DIALING IRREGULARITIES

United States Patent Office 3,403,230
Patented Sept. 24, 1968

3,403,230
EQUIPMENT FOR SERVING DIALING IRREGULARITIES

Rolland N. Breed, Middletown and Albert H. Budlong and Russell C. Casterline, Lincroft, and Bobby J. Lewis, Red Bank, N.J.; said Breed, said Budlong, and said Casterline assignors to Bell Telephone Laboratories, Incorporated, New York, N.Y., a corporation of New York, and said Lewis assignor to Western Electric Company, Incorporated, New York, N.Y., a corporation of New York
Filed July 15, 1965, Ser. No. 472,184
20 Claims. (Cl. 179—27)

ABSTRACT OF THE DISCLOSURE

A communication switching system in which partial dial and permanent signal conditions are detected on lines and are successively served by special service circuits which provide for announcement signals, tone signals and operator interception under control of a program controlled central processor. Apparatus is also provided for reconnecting the lines to line circuits and for queuing in memory lines which have partial dial and permanent signal conditions.

Figure 1:
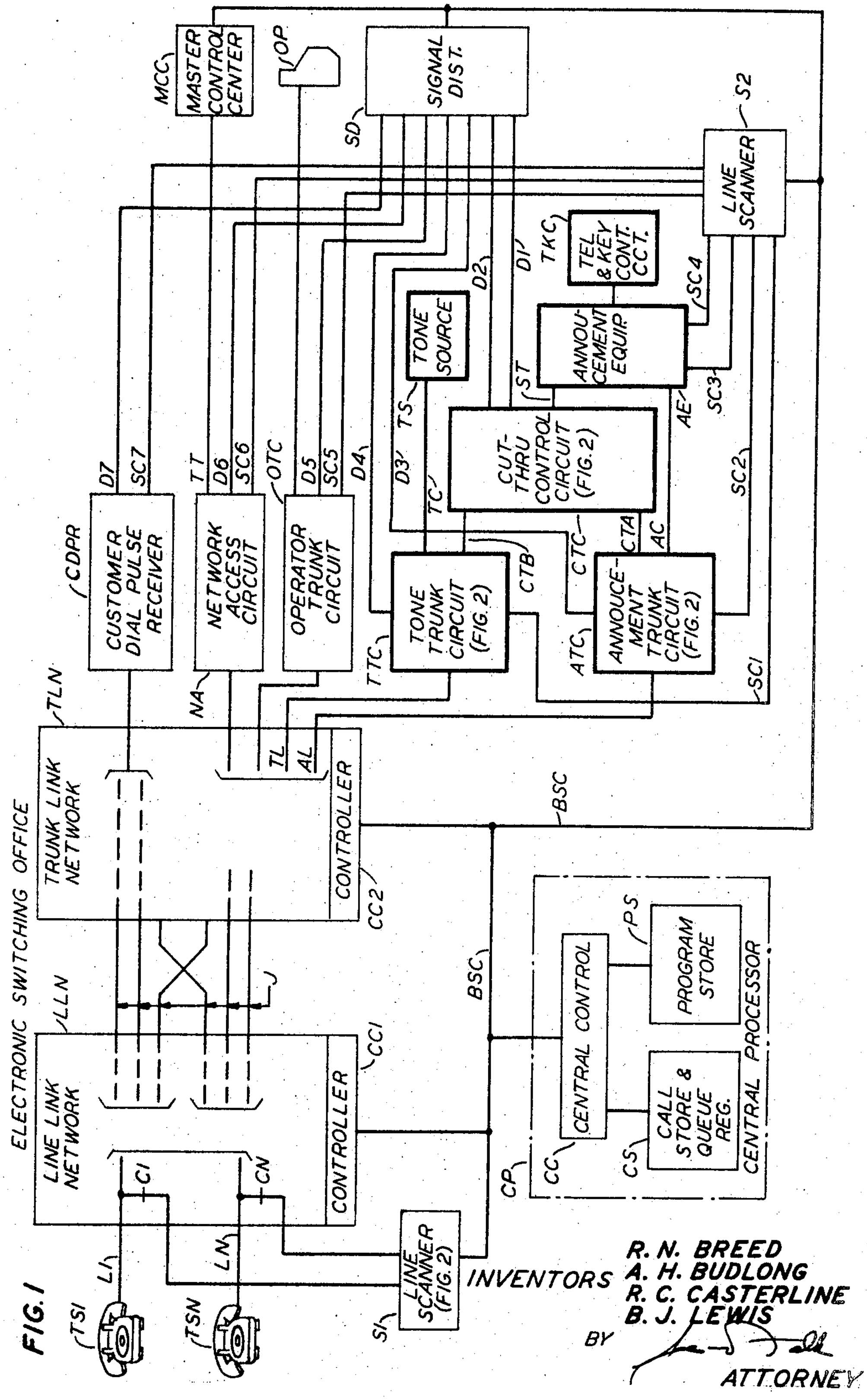

This invention relates to communication switching systems and particularly to equipment utilized in telephone systems for processing calls with minimal blockage upon the occurrence of service irregularities. Our invention further relates to switching circuits which are controlled by instructions from a program controlled data processor for sequentially processing telephone calls through service routines upon the occurrence and presistence of so-called partial dial and permanent signal conditions.

A partial dial condition arises in a telephone system when a call is initiated on a line and then an insufficient number of digits is transmitted over that line for completing the call. Such a condition frequently occurs, for example, when the customer either begins dialing before receiving a dial tone or fails to dial all of the needed digits after the receipt of a dial tone. A permanent signal condition occurs when no digit is transmitted over a calling line after the call is initiated.

Partial dial permanent signal conditions result in the unproductive tie-up of switching facilities and tend adversely to affect telephone service when they are present in large numbers. Accordingly, it is customary for a telephone system automatically to notify a caller of the occurrence of such a dialing irregularity and of the need to initiate a new call. Such a notification is often provided in existing systems by means of a recorded announcement followed by a brief receiver off-hook tone transmission to the calling line. This procedure has proven effective for causing a substantial percentage of the callers to hang up during the tone period. In those cases where it is ineffective and the condition is prolonged after the tone transmission, the calling line is connected to an operator position for additional service.

Prior art systems are usually equipped with a so-called partial dial-permanent signal holding trunk circuit which employs a large amount of expensive and complex apparatus configurations for supervising, timing and controlling the connection of a partial dial or permanent signaling line to a recorded announcement, a receiver off-hook tone, and an operator position. Frequently, a substantial number of such trunk circuits is provided in a system for serving an anticipated high volume of partial dials and permanent signals. In certain instances, however, heavy traffic periods arise which busy all of the holding trunks and block the desired automatic processing of lines having partial dials and permanent signals. As a consequence, the blockage may prevent callers from obtaining information pertaining to the dialing irregularity and the need for initiating a new call.

In view of the foregoing, it is an object of our invention to provide improved facilities for enabling a communication switching system automatically to serve calls involving service irregularities, such as partial dials and permanent signals.

It is another object of our invention to reduce call blockage due to busy circuit conditions.

Another object is to provide simple and economical equipment which efficiently switches partial dial and permanent signal lines to announcement, tone and operator position facilities with minimal blockage.

These and other objects are attained in accordance with an exemplary embodiment of our invention wherein equipment is provided in an electronic program controlled telephone system for insuring that lines having partial dials and permanent signals are automatically processed for supplying callers with an announcement and then a receiver off-hook tone even during heavy traffic periods. The equipment reduces blockage by temporarily reconnecting a calling line to its line circuit for call supervision when a desired functional circuit, such as an announcement trunk circuit, is busy on another call and by subsequently connecting the line to the desired circuit when it again is available for service. In addition, the equipment utilizes separate trunk, or service, circuits which are operated by a high speed program controlled data processor for connecting the announcement and tone via the telephone switching network to a line having a partial dial or permanent signal. The system is further equipped with additional trunk circuits for connecting partial dial and permanent signal lines to operator positions and a test center when operator assistance and maintenance are needed.

Each of these trunk circuits is simple and economical because the supervision, timing and other control functions associated with establishing connections through the circuit are centralized in common control facilities including a high speed program controlled data processor. According to our invention, each such trunk circuit comprises transmission apparatus and a minimal amount of switching apparatus. The announcement and tone trunk circuits each includes a magnetic latching relay which is operable under control of instructions from the data processor for connecting a pair of scan points to the call connections whereby the processor via a scanner can monitor the off-hook and on-hook signals from the calling line. A relay counter is also included in each announcement and trunk circuit for counting pulses from a cut-thru control circuit and for extending the calling line connections to an associated announcement machine or tone supply.

In accordance with an aspect of our invention, the cut-thru control circuit is shared by announcement and tone trunk circuits for controlling the connection of the calling line to an announcement machine at the beginning of a recorded message and the period during which a receiver off-hook tone is transmitted to a calling line. This control circuit performs these control functions by means of a single relay which is cyclically operated by pulses from a timing mechanism of the announcement machine.

The data processor cooperates with a scanner during a call both to scan a customer dial pulse receiver for the receipt of digits from a calling telephone and to detect a partial dial or permanent signal condition when a digit is not received within a predetermined number of scans. Following the detection of such a condition, the processor releases the receiver from the call and then connects an idle announcement trunk circuit through the telephone switching network to the calling line. The processor then instructs a signal distributor to activate the magnetic latching relay in the trunk circuit for connecting the scan points to the call connections and enabling the processor to monitor for the clearance of the partial dial or permanent signal condition. Thereafter, the announcement machine activates the cut-thru control circuit shortly before the beginning of the recorded message and the latter circuit, in turn, operates the relay counter in the announcement trunk circuit for connecting the calling line through to the announcement machine for sending a recorded message to the caller. At the end of the message, the announcement trunk circuit remains in a monitor state for a prescribed time to wait for the caller to hang up.

If the condition thereafter persists, the processor releases the announcement trunk circuit from the call connections and connects the calling line over a new path through the switching network to an idle trunk circuit. The processor next instructs the signal distributor to activate the latching relay in the tone trunk circuit for connecting its scan points to the call connections and enabling the processor to monitor for the clearance of the partial dial or permanent signal. Afterwards the cut-thru control circuit is activated by the announcement machine for operating the relay counter in the tone trunk circuit for connecting the calling line through to a tone supply for receiving a brief period of received off-hook tone.

When the partial dial or permanent signal is prolonged after the tone transmission, the processor releases the tone trunk circuit and then connects the calling line through the switching network and an idle operator trunk circuit to an operator position for service. An operator may then either merely recognize the presence of the call condition and wait for it to clear or attempt to serve the caller. In many instances, operator assistance is not needed at this stage of the automatic processing because the caller has received sufficient information from the announcement and tone to hang up and initiate a new call.

According to our invention, if a desired announcement, tone, or operator trunk circuit is unavailable when needed during the processing of a partial dial or permanent signal, the processor selectively reconnects the calling line to its line circuit in a so-called "high" and "wet" state, in which the line circuit is able to monitor when the calling telephone is off and on-hook, but is unable to initiate a new calling request. The processor thereafter periodically scans the line until either the partial dial or permanent signal condition is eliminated or the desired trunk circuit becomes idle. When the condition is cleared during this scanning operation, the processor restores the calling line to service. However, if the condition persists on the calling line after the desired trunk circuit becomes available, the processor connects the calling line through the switching network to the available trunk circuit for service as previously described. This sequence of operations is utilized to redce the unproductive usage of customer dial pulse receivers and other switching facilities including channels through the system switching network during busy conditions. It also insures that only the line circuitry and a minimal amount of other equipment is tied up during such periods.

An operator has an alloted time in which to serve a partial dial or permanent signal connected to her position. If the condition persists after this interval, the processor automatically releases the operator trunk and position from the call connections and attempts to connect the calling line through a network access circuit to a master control center whereat a craftsman may perform trouble tests on the calling line. When the access circuit is busy, the processor selectively reconnects the calling line to its line circuit in the "high" and "wet" state and thereafter periodically scans it to monitor for the clearance of the trouble. The processor also has facilities for establishing a queue memory of partial dials and permanent signals which concurrently exist on a plurality of lines and which are awaiting connection through the network access circuit to the control center. It also has means for connecting a predetermined line, such as one which has been in the queue for the longest time, to the network access circuit as soon as it is available.

A feature of our invention is the provision of equipment for automatically processing a service requesting communication line from its line circuit toward a desired functional service circuit, then temporarily back to the line circuit when the desired circuit is busy, and subsequently to the desired circuit when it again is available for service.

Another feature of our invention is the provision of equipment for automatically processing a calling line when a dial error occurs thereon whereby it is connected over distinct paths through a system switching network to separate trunk circuits which extend the line connections to an announcement, a tone and an operator position.

Another feature is the provision in a telephone system of common control equipment which times customer dialing and detects a partial dial or permanent signal on a calling line and which then effects the connection of that line to its line circuit when an announcement or tone trunk is unavailable for conveying a recorded announcement or receiver off-hook tone to the caller.

Another feature, directly related to the immediately previous one, is the provision of facilities in the common control equipment for periodically scanning the line circuit until either the partial dial or permanent signal condition is eliminated from the line or an announcement or tone trunk becomes available. When the latter occurs and the line condition persists, the equipment connects the line with the available trunk.

It is another feature of our invention that a switching system comprises a line circuit connectable to a communication line for monitoring for service requests, switch means responsive to the receipt of a service request in the line circuit for establishing connections from the line, a cutoff device thereafter acivated by the switch means for disconnecting the line from the line circuit, detector means responsive to a permanent signal or a partial dial on the line for controlling the cutoff device to reconnect the line to the line circuit, service equipment for supplying advisory signals, and control means responsive to the persistence of the permanent signal or partial dial for operating the switch means to connect the line to the service equipment for receiving the advisory signals.

Another feature is the provision of announcement and tone trunk circuits each of which comprises means responsive to instructions from a program controlled data processor for connecting scanner facilities over a path through a telephone switching network to a partial dial or permanent signal line and means controllable by a cut-thru control circuit and a common timing mechanism for connecting the network path to either an announcement machine or a tone source.

Figure 2:
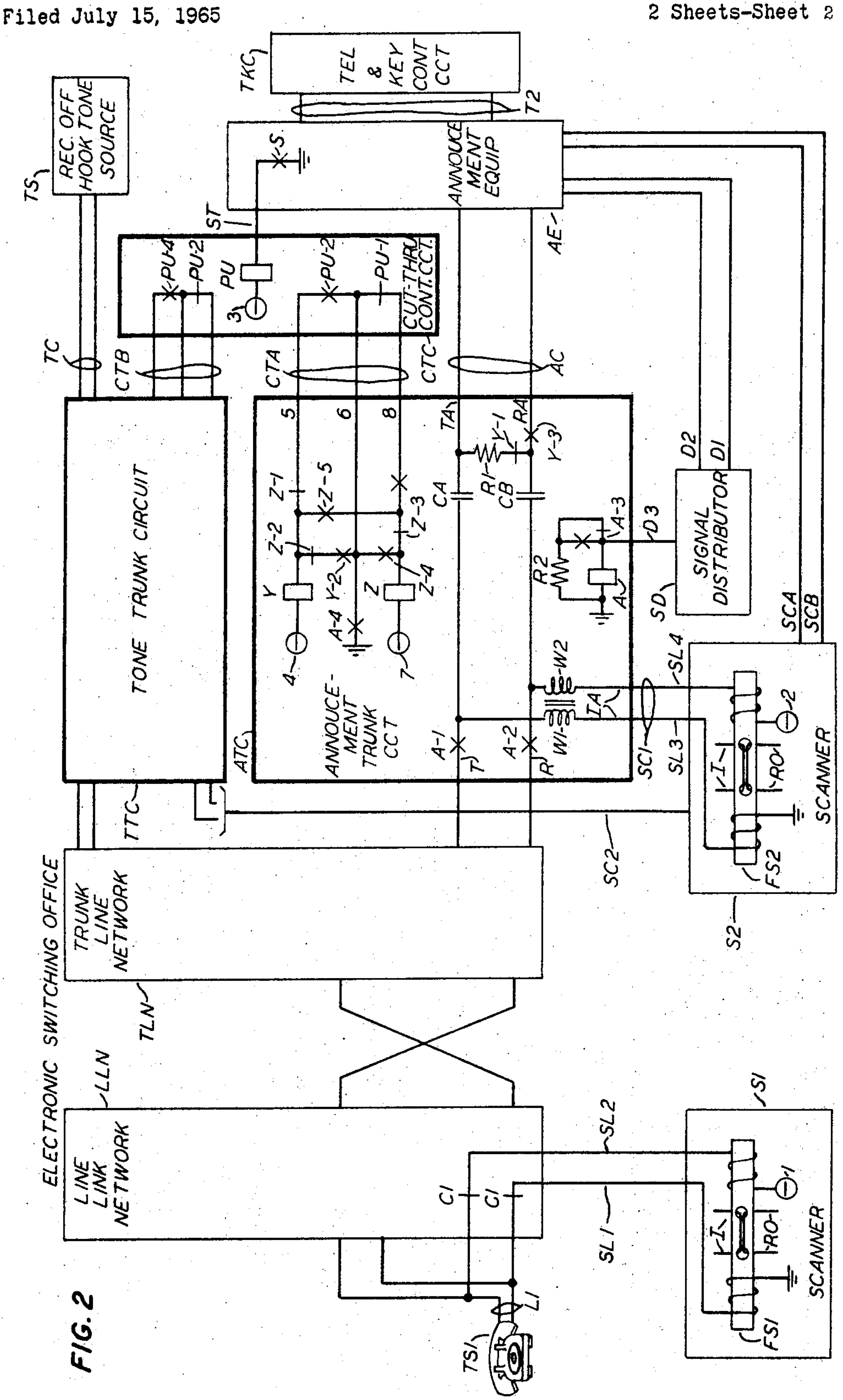

The foregoing objects, features and advantages, as well as others, of this invention, may become more clearly understood by a reading of the following description of an exemplary embodiment thereof as shown in the drawing in which:

FIG. 1 shows, in block diagram form, an exemplary electronic telephone switching system employing equipment illustrative of our invention; and FIG. 2 is a schematic drawing of a customer line circuit, announcement and tone trunk circuits, a cut-thru control circuit, a tone source, announcement equipment, and a telephone and key control circuit incorporated into the exemplary switching system.

It will be noted that FIG. 2 employs a type of notation referred to as "detached-contact" in which an "X" crossing a line represents a normally opened contact of a relay and a bar crossing a line represents a normally closed contact of a relay; "normally" referring to the nonoperated, or released, state of a relay. The other relay components including its winding are represented by a rectangular symbol. The principles of this type of notation are described in an article entitled "An Improved Detached-Contact-Type of Schematic Drawing" by F. T. Meyer in the September 1955 publication of the American Institute of Electrical Engineers Transactions, Communications and Electronics No. 20, volume 74, pp. 505–513.

Each relay contact is designated in the drawing in a manner which indicates the relay of which it is a part and, as well, uniquely identifies it with respect to the other contacts of the same relay. For example, referring to Contact A–1 shown in the center of FIG. 2, it is noted that the A portion of the designation indicates that it is controlled by the A relay of FIG. 2 and the "—1" uniquely identifies it with respect to the contact A–2 of relay A.

The principles of our invention are disclosed as incorporated, by way of example, in an electronically controlled telephone system of the type disclosed in The Bell System Technical Journal (B.S.T.J.), September 1964, Volume XLIII, Number 5, Parts 1 and 2; and in the copending A. H. Doblmaier-R. W. Downing-M. P. Fabisch-J. A. Harr-H. F. May-J. S. Nowak-F. F. Taylor-W. Ulrich patent application, Ser. No. 334,875, filed Dec. 31, 1963. The latter disclosures and the patent applications referred to therein may be consulted for a complete understanding of the construction and operation of the scanners S1 and S2, signal distributor SD, operator trunk circuit OTC, customer dial pulse receiver CDPR, the central processor CP, and the master control center MCC. While certain of the circuit details of the line link and trunk link networks LLN and TLN are set forth in the aforementioned disclosures, more definite specifications of these networks are presented in the following copending patent applications: T. N. Lowry, Ser. No. 205,920, filed June 28, 1962; now U.S. patent No. 3,231,679 issued Jan. 25, 1966; A. Feiner, Ser. No. 253,083, filed Jan. 22, 1963, now U.S. patent No. 3,257,513, issued June 21, 1966; and K. S. Dunlap-A. Feiner-R. W. Ketchledge-H. F. May, Ser. No. 295,458, filed July 16, 1963, now U.S. patent No. 3,281,539 issued Oct. 25, 1966. The network access circuit NA is disclosed in the L. F. Goeller, Jr.-J. M. Nervik patent application Ser. No. 472,233, filed July 15, 1965 simultaneously herewith.

The organization of the principal equipment units of the illustrative embodiment of our invention will now be described with reference to FIG. 1. The electronic switching system is designed to serve many different telephone stations, such as stations TS1–TSN. These stations are connected to the switching office over the telephone lines L1–LN and are terminated in both the line scanner S1 and the line link network LLN. As is described hereinafter, the scanner S1, network LLN, lines L1–LN, and the telephone stations TS1–TSN comprise the telephone line circuitry and the scanner S1 is employed for sensing on-hook and off-hook signals representing requests for service on lines L1–LN.

The network LLN comprises switching facilities for establishing communication connections from the lines L1–LN to the trunk link network TLN via network wire junctors J. Similarly, the network TLN includes switching facilities for establishing connections from the junctors J to customer dial pulse receivers, such as receiver CDPR; network access circuit NA; operator trunk circuits, such as circuit OTC; announcement trunk circuits, such as circuit ATC; tone trunk circuits, such as circuit TTC; as well as, other functional circuits, such as incoming and outgoing trunk circuits (not shown). The announcement and tone trunk circuits ATC and TTC are are referred to herein as trunk circuits; however, they are also known in the art as service circuits inasmuch as they, in fact, have no connections to trunks.

In accordance with our invention, the announcement, tone and operator trunk circuits, as well as the network access circuit have no individual line supervisory relays for monitoring "on-hook" and "off-hook" conditions on the lines L1–LN during the servicing of calls. Similarly, the dial pulse receiver circuits do not comprise any digit registers as have been heretofore employed in prior art circuits. Instead, these circuits are provided with a plurality of scan points, such as points SC1–SC2 and SC5–SC7 to which are applied the appropriate "on-hook," "off-hook" and digit signals. These scan points are connected to the scanner S2, which senses the applied signals for subsequent use by the central processor CP.

In accordance with the exemplary embodiment of our invention, the permanent signal and partial dial facilities include announcement equipment AE, a tone source TS, and a telephone and key control circuit TKC. These facilities are disclosed herein in block diagram form inasmuch as they are known in the art and the detailed apparatus configurations thereof form no part of the present invention. The equipment AE is provided with apparatus (not shown) for recording and reproducing announcements. Equipment AE and tone source TS are individually connected over the channels AC and TC to the announcement and tone trunk circuits ATC and TTC, respectively, for supplying, as later explained, an announcement and a so-called ROH (receiver off-hook) tone to those of the lines L1–LN having permanent signal and partial dial conditions. The telephone and key control circuit TKC is utilized for controlling the equipment AE so as to record, check, erase and reproduce messages.

A plurality of scan points, such as points SC3 and SC4, is furnished in the equipment AE for enabling the scanner S2 to sense when an attendant utilizes the telephone and key control circuit TKC for controlling the equipment AE. In addition, the equipment AE is connected to the signal distributor SD over a plurality of leads, such as leads D1 and D2, for enabling that distributor to activate apparatus (not shown) in the equipment AE which disconnects the channel AC from a line having a permanent signal or partial dial condition and then connects that channel over the test leads TL to the telephone (not shown) of the control circuit TKC so that an attendant may use the circuit TKC for checking, erasing and recording an appropriate announcement in equipment AE.

A cut-thru control circuit CTC is provided for cooperating with the equipment AE in order that the tone from source TS and the announcement from equipment AE are connectable via the associated trunk circuits TTC and ATC to the lines L1–LN under control of a common timing mechanism at the beginning of each announcement transmission cycle.

A vast amount of the logic, control, storage, supervision and translation functions required for the operation of the dial pulse receivers, trunk circuits, network access circuit, and the announcement equipment, as well as the other circuits of the electronic switching system are performed by the common control equipment comprising the central processor CP. Accordingly, a minimal amount of control circuitry is needed in the individual receivers, announcement equipment and trunk circuits and only the essential switching devices and transmission apparatus are included therein. These switching devices, in most instances, comprise magnetic latching relays (for example, relay A of FIG. 2) which are connected to the signal distributor SD over the leads D1–D7. As disclosed in the cited XLIII B.S.T.J., Part 2 beginning at p. 2270, this distributor acts as a buffer between the high speed central processor CP and the relatively slow-speed latching relays to provide for the operation of the relays whereby the circuits are switched into the different functional states required for serving telephone calls, as well as partial dial and permanent signal conditions on the lines L1–LN. Distributor SD causes the operation and the subsequent release of the latching relays upon the receipt of programmed instructions from the processor CP.

Communications between the distributor SD, scanners S1 and S2, and processor CP are by way of bus systems and multiconductor cables which provide discrete communication paths between selected ones of the circuits. These bus systems and cables are described in the aforementioned XLIII B.S.T.J., Part 1, pp. 2021 to 2054 and are represented herein by the bus systems and cables BSC.

As set forth in the Doblmaier et al. application and in the cited B.S.T.J. beginning at p. 1845, the processor CP is a centralized data processing facility which is employed to implement the various telephone administrative and maintenance functions of the switching system. It is functionally divided into three units comprising a call store CS, program store PS and a central control CC. The call store CS s a temporary or erasable memory facility which employs apparatus for storing information pertaining to calls in progress as well as permanent signal and partial dial call conditions. Such information includes: (1) the busy-idle status of communication paths through the line and trunk link networks LLN and TLN; (2) the digits received from a customer dial pulse receiver CDPR; (3) the busy-idle status of the announcement and tone switching circuits, operator trunk circuits, and network access circuit NA; and (4) other dat a utilized for serving permanent signal and partial dial call conditions and for recording announcements in the equipment AE.

The program store PS is a semipermanent memory facility which is employed to store the less changing system information including the system programs and a variety of translation information, such as the directory number to line equipment location data. Translation facilities are also furnished in the program store PS for deriving semipermanent information required for routing, charging, ringing and the like on telephone calls, as well as, for selectively establishing connections on permanent signal and partial dial call conditions from the lines L1–LN to the scanner S1 and to the circuits terminated in the network TLN.

The central control CC is the primary information processing unit of the system. It is capable of executing one at a time many different types of basic instructions, or orders, required for controlling the line and trunk link networks, dial pulse receivers, network access circuit, trunk circuits, as well as the tone and announcement switching circuits during telephone calls and call conditions including partial dials and permanent signals. These instructions are written in the form of programs which are stored in the program store PS. The program instructions are the vocabulary of the system and are used to inform the switching circuits of the system how and when to perform their various functions. The central control CC requests an instruction from the program store every few microseconds and, upon receiving it, executes, or commands, the appropriate circuit or circuits to carry out the appropriate functions. Accordingly, the central control CC is the hub of the system which originates all addresses and commands to other circuits and receives back all answers from those circuits. It is important to note, however, that the central control CC is capable only of executing individual instructions and that the mechanized intelligence required to supply the instructions needed for the complex switching functions of the system resides in the stored programs.

The principles and organization of the stored program facilities of the illustrative switching system are disclosed in the cited B.S.T.J. beginning at p. 1923. The specific programming of work operations for the illustrative equipment of our invention is not explained in detail herein inasmuch as such formulation is at the discretion of the system programmer and his decisions are based upon the size and traffic requirements of the particular telephone office.

Before explaining the manner in which the system serves permanent signal and partial dial conditions, it is advantageous first to describe the operations involved in erasing, recording and checking an announcement in equipment AE. When an operator lifts the handset of the telephone in the control circuit TKC, an "off-hook" signal is applied to one of the scan points, such as point SC3, of the equipment AE and it is sensed by the scanner S2. Thereafter, the central processor CP, in executing a scanning operation as disclosed in the cited B.S.T.J., interrogates the scanner S2 and reads-out the "off-hook" condition at scan point SC3. It then consults the busy-idle information stored in the call store CS for the announcement trunk circuit ATC to check whether that circuit is connected to any of the lines L1–LN via the networks TLN and LLN. The processor CP then disconnects any such lines from the circuit ATC after the completion of an announcement transmission and connects the channel AC to the control circuit TKC. Next, the processor CP cooperates with the sigal distributor SD to activate apparatus (not shown) in equipment AE which notifies the operator that she may proceed to check, erase and record an announcement in equipment AE. A typical manner in which an operator may perform the latter operations is disclosed in the R. A. Miller et al. Patent 2,866,852 issued Dec. 30, 1958, with respect to an automatic telephone answering and announcement machine which is suitable for use in the specific exemplary embodiment of our invention.

While the operator is recording an announcement, another one of the scan points, such as point SC4, of equipment AE is activated for enabling the scanner S2 to cooperate with the processor CP during the scanning operation so that information pertaining to the recording function may be sorted in the call store CS. After the operator has recorded and checked an announcement, she replaces the telephone handset (not shown) of circuit TKC and releases the control circuit TKC. As a result, an "on-hook" signal is applied to scan point SC3 and it causes the processor CP to alter the busy-idle data in the call store CS so that the equipment AE and trunk circuit ATC are again made available for serving the lines L1–LN.

Turning now to the manner in which the system serves partial dial and permanent signal conditions, it is initially assumed that a customer at station TS1 initiates a call and then either fails to dial or dials an insufficient number of digits for completing the call. When the caller removes the telephone handset from its cradle, an "off-hook" signal is sensed by the line scanner S1 as set forth in the Doblmaier et al, disclosure. Subsequently, the central control CC, in executing a line scanning operation, interrogates the scanner S1 and read-out the "off-hook" condition. It then consults the busy-idle information stored in the call store CS for each station line to insure that the "off-hook" condition has not been previously observed for line L1. Upon ascertaining that line L1 was previously "on-hook", the central control CC concludes that a call origination has occurred and it updates the busy-idle information for line L1 in the call store CS. The central control CC knows the scanner address of line L1 and uses it to refer to a translation area in the program store PS which provides it with all of the service information it needs concerning the line L1.

The central control CC then selects an idle customer dial pulse receiver CDPR. Next, the control CC ascertains the availability of an idle path from the line L1 through the networks LLN and TLN and a junctor J to the receiver CDPR by consulting the busy-idle information stored in the call store CS for all paths through the link networks. Upon finding such a path, the control CC sends orders to the networks LLN and TLN via the controller circuits CC1 and CC2 to establish the appropriate switching connections. Thereafter, the scanner S1 is disconnected from the line L1 when the network LLN opens the cutoff contacts C1 and thereby avoids any transmission degradations over the line L1 due to the scanner circuitry. The central control CC then requests the distributor SD to operate apparatus in the receiver CDPR over leads D7 for causing a dial tone to be sent to the calling line L1.

After the call connections to receiver CDPR have been established, the control CC scans the calling line L1 every few milliseconds via the scanner S2 and leads SC7 in a manner as set forth in Doblmaier et al. This scanning operation is performed to check for both the early abandonment of the call, a permanent signaling condition on line L1, and for the receipt of dial pulses by the receiver CDPR. An abandoned call condition is signified by a prolonged "on-hook" on the line L1 following the aforementioned dial tone transmission. A permanent signal condition arises on line L1 when an "off-hook" signal persists on that line and no digit has been received over the line within a prescribed number of line scans following the aforementioned transmission of dial tone. Such a condition is sensed by the scanner S2 and detected by the processor CP as described in Doblmaier et al. and the cited B.S.T.J. articles.

Each time the control CC scans the line L1, it compares the present scanner reading with the immediately preceding one which is recorded in the call store CS. Whenever a disagreement is found by the comparison and the calling telephone is found to be "on-hook" on the next scanning operation, the control CC recognizes that a digit is being transmitted and adds one to a dial pulse count kept in the call store CS for the call. A digit is deemed completed when the calling line is "off-hook" and no momentary "on-hook" change has been detected for a predetermined interdigital period. When the control CC receives a first digit pulse transmitted by the station TS1, it causes the dial tone transmission to that station to be interrupted as set forth in Doblmaier et al.

If a digit has been dialed before dial tone has been returned to the calling line L1 or if an insufficient number of digits has been dialed, the processor CP, in executing a scanning operation via scanner S2, recognizes that a partial dial condition exists on that line. The recognition is made when the interval following the receipt of the last dialed digit exceeds an allowable period such as 16 to 32 seconds.

In response to a recognition of a permanent signal or partial dial condition, the central control CC stores information in the call store CS pertaining to line L1 and the condition. The processor CP then releases the dial pulse receiver CDPR and the connections therefrom to line L1 for enabling them to serve another call. Thereafter, the control CC ascertains the availability of both an announcement trunk circuit, such as circuit ATC, and a communication channel therefrom through the networks TLN and LLN to line L1.

If a trunk circuit ATC is available, the processor CP instructs the controllers CC1 and CC2 to establish connections via an idle channel from line L1 through network LLN and TLN. Processor CP then notifies the distributor SD to activate circuit ATC over lead D3 so that it connects scanner S2 over leads SC2 to monitor for the clearance or persistence of the permanent signal or partial dial on line L1. Thereafter, the announcement equipment AE activates the cut-thru control circuit CTC over leads CTA shortly before the beginning of the next recorded announcement cycle. The activated circuit CTC, in turn, operates the circuit ATC for cutting through the connections from line L1 to equipment AE which transmits an appropriate prerecorded announcement via the channel AC, circuit ATC, and the networks TLN and LLN to line L1 for informing a person at station TS1 of the dialing irregularity manifested by the permanent signal or partial dial condition.

While the illustrative embodiment of our invention discloses one announcement trunk circuit ATC and one announcement equipment AE for serving both permanent signal and partial dial conditions, it is to be understood that separate such trunk circuits and announcement equipments may be used for furnishing individual permanent signal and partial dial announcements and control functions. In addition, groups of such circuits may be furnished according to traffic needs. It is also within the ambit of our invention to use a recorded tone or other audible signal instead of the recorded announcement for alerting a caller of the dialing irregularity.

During the announcement transmission, the processor CP cooperates with scanner S2 to monitor for the clearing of the permanent signal or partial dial condition on line L1. The processor CP detects when such a condition clears and then orders the distributor SD to deactivate the circuit ATC over lead D3 whereby it disconnects scanner S2 from the connections between equipment AE and line L1. The latter connections are released under control of controllers CC1 and CC2 in response to instructions from processor CP.

If, after a playing of the recorded announcement, the permanent signal or partial dial yet persists on line L1 by the station TS1 remaining "off-hook," equipment AE subsequently operates the control circuit CTC over lead ST and it, in turn, causes circuit ATC to disconnect equipment AE from line L1. In addition, the processor CP cooperates with scanner S2 to detect over lead SC3 the end of the announcement cycle and over lead SC2 the persistence of the permanent signal or partial dial on line L1. The persistence of such a condition beyond an announcement cycle is recognized by the processor CP during the execution of a scanning operation on line L1 via scanner S2. Processor CP then instructs the distributor SD to release circuit ATC over lead D3. It also instructs the controllers CC1 and CC2 to effect the release of the connections from the released circuit ATC through networks TLN and LLN to line L1. The central control CC then consults the call store CS to ascertain the availability of a tone trunk circuit TTC and connections therefrom through networks TLN and LLN to line L1.

If a trunk circuit TTC is available, the processor CP notifies controllers CC1 and CC2 to activate networks LLN and TLN for establishing available connections between line L1 and circuit TTC. Next, the processor CP instructs the distributor SD to activate circuit TTC whereby it connects scanner S2 to the established connections whereby it monitors for the clearance or persistence of the permanent signal or partial dial on line L1 preparatory to the transmission of a so-called ROH (receiver-off-hook) tone from a tone source TS via channel TC, circuit TTC, and networks TLN and LLN to line L1. This tone is transmitted under control of a timing mechanism in the announcement equipment AE which cyclically operates the cut-thru control circuit CTC over leads CTA shortly before the beginning of a recorded announcement cycle. In operating, circuit CTC activates circuit TTC for cutting through the connections from line L1 to tone source TS which transmits the ROH tone as a signal for a person at station TS1 to replace the telephone handset in its cradle.

While the tone transmission is in progress, processor CP cooperates in a scanning operation with scanner S2 to monitor for the clearing of the permanent signal or partial dial on line L1. The processor CP detects when such a condition clears and then orders the distributor SD to deactivate circuit TTC over lead D4 whereby the scanner S2 is disconnected from the connections between source TS and line L1. The latter connections are then released under control of controllers CC1 and CC2 in response to program instructions from processor CP.

If the permanent signal or partial dial on line L1 is prolonged beyond the period of the announsement cycle, the timing mechanism in equipment AE operates circuit CTC which, in turn, causes circuit TTC to open the connections between line L1 and tone source TS. At about the same time, processor CP cooperates with scanner S2 to check over lead SC1 for the prolongation of the permanent signal or partial dial and then it instructs the distributor SD to effect the release of circuit TTC over lead D4. Next, processor CP instructs controllers CC1 and CC2 to release the connections via networks LLN and TLN between line L1 and circuit TTC.

After the latter operations have been completed, line L1 is connected under control of processor CP to an available operator position OP via networks LLN and TLN and an operator trunk circuit OTC. Such connections are established in response to program instructions supplied by the program store PS to the central control CC which accordingly activates the networks LLN and TLN via controllers CC1 and CC2 and then the trunk circuit OTC via distributor SD. An operator is next alerted for furnishing a person at station TS1 with information as to the permanent signal or partial dial and for providing any other assistance such as may be needed to report an emergency to a hospital, fire or police headquarters.

A permanent signal or partial dial line L1 is connected to an operator position OP for a predetermined period, for example 60 to 90 seconds, within which an operator may attempt to communicate with a person at station TS1 for furnishing service whereby the line condition may be cleared. During the latter period, the processor CP in conjunction with scanner S2 monitors the line L1 via leads SC5 and trunk circuit OTC to detect the cessation of the permanent signal or partial dial. If it ceases, the processor CP instructs the distributor SD and controllers CC1 and CC2 to release trunk circuit OTC and connections therefrom through networks LLN and TLN to line L1.

When the permanent signal or partial dial yet persists on line L1 after the period allotted for the operator service, the processor CP instructs the distributor SD and controllers CC1 and CC2 to release circuit OTC and the TLN and LLN network connections to line L1. Subsequently, the central control CC consults the call store CS for the busy-idle status of the network access circuit NA preparatory to the connection of line L1 to the master control center MCC for maintenance by a craftsman.

Only one network access circuit NA is assigned in the system for serving permanent signals and partial dials because the processor CP has the ability to establish a queue memory of permanent signal and partial dial lines which have been subjected to all parts of the permanent signal or partial dial sequencing except for being connected to access circuit NA. Consequently, if permanent signals or partial dials exist simultaneously on more than one of the lines TS1–TSN, a predetermined line, for example the line that has been in the queue for the longest time, will be connected to the access circuit NA as soon as it becomes idle.

After the central control CC ascertains that circuit NA is idle, it obtains instructions from the program store PS for activating networks LLN and TLN and access circuit NA, whereby, if line L1 has been in the queue the longest, it is connected to circuit NA which first checks the resistance of line L1 and then interconnects that line with the control center MCC via the test trunk TT as described in the cited Goeller et al. application. The processor CP then also effects the transmission of instructions via the bus system BSC to center MCC for alerting a craftsman to the permanent signal or partial dial and informing him whether line L1 is associated with a coin or noncoin telephone.

Thereafter, the craftsman may challenge on the line L1 and apply thereto a tone facility (not shown) in an effort to clear the condition. If these actions fail, he may test the line L1 over the established connections with a voltmeter circuit (not shown). When the line condition is cleared during these operations, the system automatically restores the line L1 to service, notifies the craftsman via a teletypewriter (not shown) that the line L1 is free of trouble, and releases the established connections.

On the other hand, if the craftsman is unable to clear the permanent signal or partial dial on line L1, he may cause signals to be introduced in the system for instructing it to disconnect line L1 from the access circuit NA by releasing the appropriate TLN and LLN network connections. After these connections are released, the system causes the directory number of line L1 to be printed on a teletypewriter (not shown), as described in the cited B.S.T.J. for retaining a record of the persisting permanent signal or partial dial line. It also causes data pertaining to line L1 to be stored in a so-called "high and wet" list memory of the call store CS so as to enable that line to be periodically scanned, as hereinafter described, for the clearance of the condition.

It is advisable at this point to explain the call processing which occurs in accordance with a specific illustrative embodiment of our invention when a permanent signal or partial dial line, such as line L1, is to be connected to an announcement or tone or operator trunk circuit ATC, TTC or OTC according to the sequences hereinbefore described and when the desired one of such circuits is unavailable. As previously explained, the central control CC ascertains the busy-idle status of a desired circuit from the call store CS. Upon ascertaining that such a circuit is busy, the central control CC receives instructions from the program store PS to release the connections from line L1 through the networks LLN and TLN and to reconnect the line L1 via its cut-off contacts C1 to scanner S1. Afterwards, data pertaining to the line L1 is stored in a so-called "high and wet" list memory of the call store CS.

In response to the storage of line data in "high and wet" list memory, the central control CC receives instructions from the program store PS for making periodic scans of that line via the scanner S1 to check for the clearance of the partial dial or permanent signal condition. If, during this periodic scanning operation, the partial dial or permanent signal is cleared, the processor CP erases the data pertaining to line L1 from the "high and wet" list memory and restores line L1 to service. The system then automatically notifies the craftsman at the master control center MCC via a teletypewriter (not shown) that the line is free of trouble.

However, when a desired one of the trunk circuits ATC, TTC or OTC becomes idle while the line L1 is yet being periodically scanned and before the partial dial or permanent signal condition is eliminated, the data pertaining to line L1 is erased from the "high and wet" list memory and the central control CC receives instructions from the program store PS in response to which it disconnects line L1 from scanner S1 and effects the establishment of connections from line L1 through networks LLN and TLN to the available circuit. This sequence of operations is controlled by the programmed instructions stored in the program store PS and is utilized to reduce the unproductive usage of customer dial pulse receivers CDPR and other switching circuits terminated in the network TLN as well as channels through the networks TLN and LLN. It also insures that only the line circuitry and a minimal amount of other equipment is tied up on the call conditions.

It is advantageous to note that in accordance with our invention the processing of the line L1 to the various announcement, tone and operator trunk circuits, as well as the master control center can be altered by means of simple program changes in the call store CS and program store PS without complicated wiring changes as in prior art circuits. To illustrate, it is within the contemplation of another embodiment of our invention that appropriate programs stored in the call store CS and program store PS enable the processor CP to recognize when a desired one of the announcement, tone or operator trunk circuits ATC, TTC or OTC is unavailable at the instant it is desired and to advance the processing of a line having a permanent signal or partial dial so that, instead of being connected to its line circuit in the "high and wet" state, it is connected to the next stage of the previously described sequencing of such a call condition. For example, if a trunk circuit ASC is unavailable for connection to a permanent signaling line at the desired time, the processor CP in response to the stored program instructions connects that line to a tone trunk circuit TTC. In like fashion, if the latter circuit is also unavailable, the processor CP connects the line via the networks LIN and TLN to an available operator trunk circuit OTC. According to another aspect of our invention, if a trunk circuit ATC is unavailable for connection to a partial dial or permanent signaling line at the desired time, the program instructions may be formulated whereby the processor CP controls the connection of that line through networks LLN and TLN to an available operator trunk circuit OTC, and thus bypassing the receiver off-hook tone transmission. The flexibility inherent in the equipment of our invention also enables the stored program in the processor CP to be alternatively arranged to connect a partial dial or permanent signaling line directly to the network access circuit NA or the queue memory when an announcement trunk circuit ATC is unavailable.

Referring now to FIG. 2, a more detailed description is presented of the structure and operations of a telephone line circuit, the announcement and tone trunk circuits ATC and TTC, as well as the cut-thru control circuit CTC and scanners S1 and S2 embodying features of our invention. In the illustrative embodiment of FIG. 2, the apparatus configuration of the announcement trunk circuit ATC is essentially the same as that of the tone trunk circuit TTC. The scanner S2 and signal distributor SD also utilize essentially the same apparatus configurations for controlling the trunk circuits ATC and TTC. Accordingly, the schematic of FIG. 2, for simplicity, depicts only the apparatus configuration used for the circuit ATC.

The telephone line circuit comprises a telephone instrument at station TS1, a line L1, cutoff contacts C1 of the line link network LLN, scan leads SL1 and SL2, and a ferrod sensor FS1 of the scanner S1. Ferrod FS1 is a monitoring device which senses the presence or absence of current flow through the leads SL1 and SL2. Line current is present in such leads when the associated telephone is "off-hook." Such current is absent from leads SL1 and SL2 when the telephone is "on-hook."

A ferrod comprises a rod, or stick, of ferromagnetic material which, in closed flux paths, exhibits remanent flux switching characteristics, but which is substantially nonremanent about its elongated, open flux path dimension. Around the stick are wound a pair of control windings and each such winding is connected to a potential source, such as ground or negative potential 1, and to an individual one of the scan leads, such as leads SL1 or SL2 for selectively sensing the "on-hook" and "off-hook" signals.

In addition, the ferrod comprises an interrogate winding I and a read-out winding RO, each of which is threaded through each of a pair of holes in the ferrod stick. The periphery of each such hole exhibits remanent flux switching characteristics. When current flows through the control windings of a ferrod, the ferromagnetic material is saturated and its incremental permeability approaches that of air. When no current flows through the control windings, the permeability of the ferrod is relatively high. This low-high permeability characteristic of the ferrod is utilized for enabling the device to sense "on-hook" and "off-hook" signals and for interrogating and reading out the sensed signals.

J. A. Baldwin, Jr.-H. F. May patent 3,175,042 dated Mar. 23, 1965 and the cited B.S.T.J., p. 2257 et seq. may be consulted for additional disclosure of the structure and operation of ferrods.

As disclosed in Doblmaier et al., the central processor CP (FIG. 1) and scanner S1 cooperate under program control to scan periodically the line L1 by selectively applying pulses to the interrogate winding I of ferrod FS1. When the telephone of station TS1 is "on-hook" at the time of interrogation, the interrogating pulse is coupled by transformer action to the read-out winding RO of ferrod FS1 for indicating that no service is being requested. On the other hand, when the telephone is "off-hook" at the time ferrod FS1 is interrogated, the ferrod is saturated by the current flow from the ground and potential 1 of scanner S1 through the FS1 ferrod control windings, leads SL1 and SL2, contacts C1, line L1 and the telephone. As a result, the interrogate pulse is essentially not coupled to the read-out winding RO of ferrod FS1 so as to indicate an "off-hook" signal and a request for service.

Reference may be made to the description, hereinbefore presented, for an explanation of the manner in which the line L1 is sequentially connected to a customer dial pulse receiver CDPR (FIG. 1) in response to a calling request for service, disconnected from the scan leads SL1 and SL2 by contacts C1 to prevent transmission degradations due to scanner circuitry, and thereafter connected to the announcement switching circuit ASC via the trunk link network TLN upon the occurrence of a permanent signal or partial dial condition.

Trunk circuit ATC provides a communication path over the tip and ring leads T and R from the network TLN and another communication path over leads TA and RA to the announcement equipment AE. (The latter path in the tone trunk circuit TTC is connected over the tone channel TC to the overflow tone source OTS.) In circuit ATC, the leads T and R are selectively interconnected with leads TA and RA via the capacitors CA and CB under control of contacts of a magnetic latching relay A and the relay Y.

Capacitors CA and CB are utilized for D.C. (direct current) isolation between the network TLN and the announcement equipment AE. These capacitors also cooperate with the resistor R1 and contact Y–1 to provide a desired electrical termination for one of the lines L1–LN when the circuit ATC is switched into its monitor state, as later explained, during a permanent signal or partial dial condition.

The magnetic latching relay A of circuit ATC is operated by a pulse of one polarity on lead D3 and is subsequently released by another pulse of opposite polarity on the same lead. These pulses are supplied by the signal distributor SD under control of the central processor CP (FIG. 1). The control circuit for relay A includes a contact A–3 and a resistor R2, which shunt the winding of the relay when it is operated. As set forth in Doblmaier et al., relay A is operated when distributor SD applies a momentary pulse potential to lead D3 and thereby completes the path through the relay winding to ground. Upon operating, relay A magnetically latches, or locks, its contacts in the actuated position and establishes the aforementioned shunt path around its winding to increase the current flow over lead D3. The distributor SD detects this current increase and is thereby notified that relay A has been operated.

In operating, relay A switches the circuit ATC from its idle state into its monitor state whereby contacts A–1 and A–2 connect the leads T and R to the impedance termination comprising the capacitors CA and CB in series with resistor R1 and contact Y–1 to minimize spurious signals on the communication channel through networks TLN and LLN to line L1. At the same time, contacts A–1 and A–2 connect leads T and R through the windings W1 and W2 of inductor IA and the control windings of ferrod FS1 to ground and negative potential 2 in scanner S2. As a result, a circuit path is completed from the telephone of station TS1 through networks LLN and TLN, circuit ATC, scan leads SL3 and SL4 and ferrod FS2 to ground whereby ferrod FS2 is saturated to indicate an "off-hook" condition on line L1. Thereafter, the central processor CP (FIG. 1) cooperates with scanner S2, as explained in Doblmaier et al., to scan ferrod FS2 by applying pulses to its interrogate winding I and monitoring its read-out winding RO to detect output "off-hook" and "on-hook" signals thereat which indicate the persistence or clearance of a permanent signal or partial dial condition on line L1.

The windings W1 and W2 of inductor IA provide a low D.C. resistance from leads T and R over scan leads SL3 and SL4 to ferrod FS2 for enabling that ferrod to sense the "off-hook" and "on-hook" signals on line L1 during a permanent signal or partial dial. In addition, the windings W1 and W2 provide a relatively high impedance across leads T and R at voice frequencies to prevent the impairment of a recorded announcement transmission from the equipment AE to station TS1 during a permanent signal or partial dial condition.

A single pick-up relay PU in the cut-thru control circuit CTC is used to control the establishment of connections from leads TA and RA of circuit ATC to the announcement equipment AE and from circuit TTC over channel TC to the overflow tone source OTS. Relay PU is operated over a path including the negative potential 3, the relay winding and lead ST to ground potential via apparatus in equipment AE including a contact S on a switching device (not shown) which is actuated a short time prior to a playing of a prerecorded announcement by equipment AE over the channel AC. Relay PU is released when its operate path is opened at contact S during a recorded announcement transmission. In this manner, relay PU actuates its contacts PU1–PU4 to control the duration of both the announcement and tone transmission to a line having a permanent signal or partial dial condition.

The contacts PU–1 and PU–2 control a two-relay counter including the relays Y and Z in trunk circuit ATC. These relays count two successive operations of relay PU. The counter is initially enabled to start the counting by the operation of relay A which closes its contact A–4 and thereby supplies the enabling ground potential to the contact configuration of relays Y, Z and PU. After relay A has operated and relay PU subsequently operates for a first time, as previously explained, a path is completed for operating the relay Y. This path is from the negative potential 4 through the Y relay winding, contact Z–1, lead 5, contact PU–2, lead 6 and contact A–4 to ground. In operating, relay Y locks via contacts Z–2, Y–2 and A–4 to ground. The operation of relay Y disconnects resistor R1 from across leads TA and RA. Operated relay Y also extends the connections from leads T and R through contacts A–1 and A–2, capacitors CA and CB, and contact Y–3 to equipment AE which shortly afterwards transmits a recorded announcement over the established connections to station TS1 in an attempt to clear the permanent signal or partial dial condition.

While the announcement is being transmitted, the equipment AE removes ground from lead ST for releasing relay PU. In releasing, relay PU causes the operation of relay Z over the path from the negative potential 7 through the Z relay winding, contacts Z–3 and Y–4, lead 8, contact PU–1, lead 6, and contact A–4 to ground. Upon operating, relay Z locks via contacts Z–4 and A–4 to ground. It also completes another locking path for relay Y through contact Z–5, Y–4, lead 8, contact PU–1, lead 6, and contact A–4 to ground.

At the end of a playing of the recorded announcement, the equipment AE recycles. Shortly before the next playing of the announcement, relay PU is operated for a second time over the described path and thereby opens its contact PU–1 for releasing relay Y. In releasing, relay Y activates its contact Y–3 to open the path for transmitting the announcement from equipment AE via leads T and R toward line L1. The release of relay Y also reconnects resistor R1 in series with capacitors CA and CB to provide the impedance termination across leads T and R.

While the foregoing operations are in progress, the processor CP (FIG. 1) scans ferrod FS2, as previously explained, for detecting whether an "on-hook" signal is received from line L1 signifying that the permanent signal or partial dial condition has been cleared. When the condition either clears at any time during the scanning operation or fails to clear within a predetermined number of scans of ferrod FS2 after the aforementioned release of relay Y, the processor CP instructs the distributor SD to effect the release of relay A. In releasing, relay A opens its contact A–4 to remove the locking ground from the relays Y and Z to effect their release. At the same time, relay A opens its contacts A–1 and A–2 to disconnect ferrod FS2 from leads T and R. The circuit ASC then rests in its idle state. Thereafter, the processor CP releases the connections from line L1 to leads T and R of circuit ATC.

If the permanent signal or partial dial condition has cleared, contacts C1 are actuated for reconnecting line L1 to ferrod FS1 which afterwards monitors for calling service requests.

When the permanent signal or partial dial persists on line L1 after circuit ATC returns to its idle state, the processor CP connects line L1 via networks LLN and TLN to an idle tone trunk circuit TTC which then serves the call condition in essentially the same manner as described with respect to circuit ATC except that instead of supplying a recorded announcement to line L1, circuit TTC couples a receiver off-hook tone thereto.

At this point, it is advantageous to describe the call processing which occurs when a partial dial or permanent signaling line L1 is to be connected to an announcement or tone trunk circuit ATC or TTC, or an operator trunk circuit OTC in accordance with the previously described sequences and when the desired one of such circuits is unavailable. After the processor CP ascertains that such a circuit is busy, it reconnects the line L1 through the cut-off contacts C1 to ferrod FS1 via leads SL1 and SL2. Thus, the line L1 is connected into what is known in the art as a "high and wet" state, that is, a state in which it is connected in its line circuit with the ground and negative potential 1 applied thereto; but, the processor CP and scanner S2 do not recognize calling service requests from that line.

Subsequently, data pertaining to line L1 is stored in a "high and wet" list memory of the call store CS (FIG. 1) and, in response to such storage and programmed instructiosn, the processor CP is activated to make periodic scans of ferrod FS1 to check for the clearance of the permanent signal or partial dial condition. If, during this scanning operation, the condition is cleared, the processor CP erases the data for line L1 from the "high and wet" list memory and thereafter recognizes calling requests for service.

It is to be understood that the hereinbefore described arrangements are illustrative of the application of the principles of our invention. In light of this teaching, it is apparent that numerous other arrangements may be devised by those skilled in the art without departing from the spirit and scope of the invention.

What is claimed is:

1. In a switching system, a line circuit connectable to a communication line for monitoring for service requests, switch means responsive to the receipt of a service request in said circuit for establishing connections from said line, a switching device thereafter activated by said switch means for disconnecting said line from said circuit, detector means responsive in the absence of a prescribed signal transmission from said line for controlling said device to reconnect said line to said line circuit, service equipment for supplying advisory signals, and control means responsive to the persistence of said service request for operating said switch means to connect said line to said equipment for receiving said advisory signals.

2. In a switching system as set forth in claim 1, the combination wherein said service equipment comprises a plurality of service circuits each of which supplies distinct advisory signals, and wherein said control means includes means responsive to a prolonged service request for operating said switch means to connect said line successively to each of said service circuits for receiving each of said advisory signals.

3. In a switching system as set forth in claim 2, the combination further comprising a device for furnishing recorded announcement signals, a source for providing tone signals, said announcement device and said source each being individually associated with one of said service circuits, and switching control facilities common to said service circuits and operable for controlling said associated service circuits to switch said announcement and tone signals from said device and source over the connections to said line for prescribed time periods.

4. In a switching system as set forth in claim 3, the combination wherein said announcement device comprises means for supplying control signals proximate to the beginning of each of said recorded announcement signals, and said switching control facilitates comprises an electromechanical apparatus responsive to said control signals for controlling said associated service circuits selectively to switch said announcement and tone signals over the connections to said line for prescribed time periods.

5. In a switching system as set forth in claim 4, the combination wherein each of said associated service circuits comprises an electromechanical switching arrangement jointly controllable by said electromechanical apparatus and said control means for switching said signals from said associated announcement device and source over said connections to said line.

6. In a switching system as set forth in claim 5, the combination wherein each of said electromechanical switching arrangements comprises relay means operable for counting said control signals supplied by said announcement device means, a relay controllable by said control means for enabling said relay means to operate for counting said control signals, and means including contacts controllable by said relay and said relay means for switching said signals from said associated announcement device and source over said connections to said line.

7. In a switching system in accordance with claim 6, the combination wherein said electromechanical device comprises a control relay having individual groups of contacts, wherein each of said relay counting means comprises a pair of relays each having an operating path including an individual group of said contacts of said control relay and being operable for counting said control signals supplied by said announcement device means, and wherein each of said associated service circuits further comprises a potential for operating said pair of relays therein, and said enabling means comprises a contact for connecting said potential to said operating paths of said pair of relays in the same service circuit.

8. In a switching system in accordance with claim 6, the combination wherein each of said associated service circuits further comprises capacitor means, a resistor, a pair of input conductors associable with said connections to said line, and a pair of output conductors connected to the associated announcement device and tone source, and wherein said contacts are controllable by said relay and relay means for selectively connecting said input conductors in series with said capacitor means and said resistor and through said capacitor means to said output conductors.

9. In combination, a line circuit connectable to a communication line for monitoring for service requests, switch means responsive to the receipt of a service request in said circuit for establishing connections from said line, a plurality of functional circuits selectively connectable to connections established from said line for serving received service requests, means responsive to said received request when predetermined ones of said functional circuits are unavailable for serving said request for controlling said switch means to release said established connections from said line, and control means subsequently responsive to the persistence of said request in said line circuit for activating said switch means to connect said line to one of said functional circuits.

10. In combination, a line circuit connectable to a communication line for monitoring for service requests, switch means responsive to the receipt of a service request in said circuit for establishing connections from said line, a switching device thereafter activated by said switch means for disconnecting said line from said circuit, a plurality of functional circuits selectively connectable to establish connections to said line for serving received service requests thereon, detector means responsive to a received request when a desired one of said circuits is unavailable for serving said request for controlling said device to reconnect said line to said line circuit, and control means subsequently responsive to the persistence of said request for operating said switch means to connect said line to said desired one of said circuits.

11. In combination, a line circuit connectable to a communication line for monitoring for service requests, a digit receiver, switch means responsive to the receipt of a service request in said circuit for establishing connections from said line to said receiver, a switching device thereafter activated by said switch means for disconnecting said line from said circuit, a detector for detecting the failure of said receiver to receive a digit from said line within an allotted time, a service circuit for supplying an advisory signal, means controlled by said detector for deactivating said device to reconnect said line to said line circuit when said service circuit is unavailable for supplying said signal, and means thereafter responsive to the persistence of said service request in said line circuit after the detection of said failure for activating said switch means to establish connections between said line and said service circuit.

12. In combination, a line circuit connectable to a communication line for monitoring for service requests a digit receiver, switch means responsive to the receipt of a service request in said circuit for establishing connections from said line to said receiver, a detector for detecting the failure of said receiver to receive a digit from said line within an allotted time, a plurality of service circuits, each of which supplies distinct advisory signals, and means activated by said detector for controlling said switch means successively to establish separate connections from said line through said switch means to each of said service circuits for supplying said advisory signals to said line.

13. The combination in accordance with claim 12 further comprising an operator position, a trunk circuit associated with said switch means for extending connections to said position, and means responsive to a busy condition of said service circuits for activating said switch means immediately to connect said line over said trunk circuit to said operator position.

14. The combination in accordance with claim 13 further comprising a control center, an access circuit interconnecting said switch means and said center, and means operable a predetermined time after said line is connected to said operator position for controlling said switch means to connect said line to said center via said access circuit.

15. The combination in accordance with claim 14 further comprising a switching device activated by said switch means upon the establishment of said connections from said line for disconnecting said line from said line circuit, means for deactivating said device to reconnect said line to said line circuit when said access circuit is unavailable, and means subsequently responsive to the receipt of said service request in said circuit for controlling said switch means to connect said line to said access circuit when it is available.

16. In a switching system, a line circuit connectable to a communication line for monitoring service requests, a digit receiver, switch means responsive to the receipt of a service request in said circuit for establishing connections from said line to said receiver, a switching device thereafter activated by said switch means for disconnecting said line from said circuit, a detector for detecting the failure of said receiver to receive a digit from said line, service equipment for supplying distinct advisory signals, means activated by said detector for controlling said switch means to establish connections from said line to said equipment for supplying said advisory signals to said line, and means controllable by said equipment for deactivating said device to reconnect said line to said line circuit.

17. In a switching system as set forth in claim 16, the combination further comprising means controllable upon the reconnection of said line to said line circuit and thereafter being selectively responsive to said service request for controlling said switch means to establish connections from said line to said equipment for supplying advisory signals to said line.

18. A communication switching system comprising communication lines, line circuits each being individually assocated with one of said lines to monitor for service requests, a scanner for periodically scanning said circuits for the receipt of service requests on said lines, a digit receiver, switch means operable for establishing communication connections, control means activated by said scanner for operating said switch means to establish connections between said receiver and a service requesting one of said lines, means controlled by said control means for disconnecting said one requesting line from said associated line circuit upon its connection to said receiver, another scanner for recurrently scanning said receiver for the receipt of digits from said one requesting line, a detector activated by said other scanner for detecting the failure of said receiver to receive a digit from said one requesting line within an allotted time, a service circuit connectable through said switch means to said line and operable for sending advisory signals to said requesting line after a failure detection, means operable for reconnecting said requesting line to said associated line circuit after a failure detection, and means activated by said control means for selectively operating said service circuit and said reconnecting means.

19. A program controlled telephone system comprising a plurality of telephone lines; a data receiver; link connector means operable for establishing connections between any of said lines and said receiver; a line scanner having an individual ferrod associated with each of said lines for sensing a service request on said associated line; common control means having stored program instructions, means responsive to said instruction for interrogating each of said ferrods to read-out a service request from the associated one of said lines, and means responsive to the read-out request and other of said instructions for controlling the operation of said connector means to establish connections between said one requesting line and said receiver; another scanner having means controllable by said detecting means for sensing received data signals from said one requesting line; said control means further including means responsive to said program instructions for interrogating said other scanner to detect said sensed signals, and means activated for detecting the failure of said other scanner to sense a predetermined data signal receivable from said one requesting line; circuitry for supplying announcement signals; means for supplying tone signals; means for interconnecting said switch means with an operator position; and means in said control means activated by said detecting means for operating said switch means to establish connections successively from said one requesting line to said announcement signals supplying circuitry, said tone signals supplying means and said interconnecting means.

20. A program controlled telephone system in accordance with claim 19, further comprising apparatus in said connector means responsive to the establishment of connections from said one requesting line for disconnecting said one requesting line from the associated ferrod; an access circuit associated with said connector means for furnishing access to a control center; said control means further comprising means responsive to said instructions for controlling said apparatus to reconnect said one requesting line to said associated ferrod, means for establishing a queue memory of said lines reconnected to the associated ferrods, and means controlled by said program instructions for operating said connector means to establish connections from a predetermined one of said reconnected lines to said access circuit.

References Cited

UNITED STATES PATENTS

| | | | |
|---|---|---|---|
| 3,161,732 | 12/1964 | Martin et al. | 179—27.3 |
| 3,201,521 | 8/1965 | Mayer et al. | 179—27.3 |

KATHLEEN H. CLAFFY, *Primary Examiner.*

LAURENCE WRIGHT, *Assistant Examiner.*